T. WALLACE & G. W. HYDE.
Machine for Hulling and Cleaning Grain.
No. 161,367.
Patented March 30, 1875.
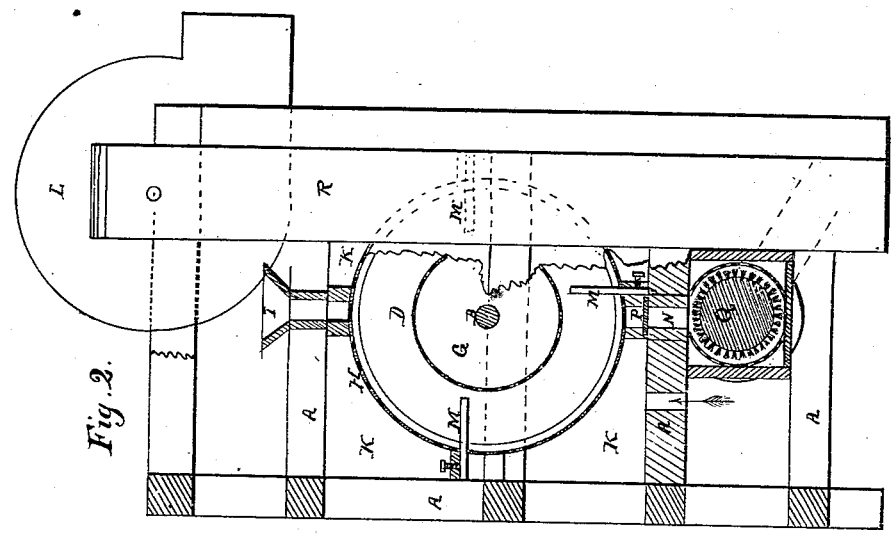
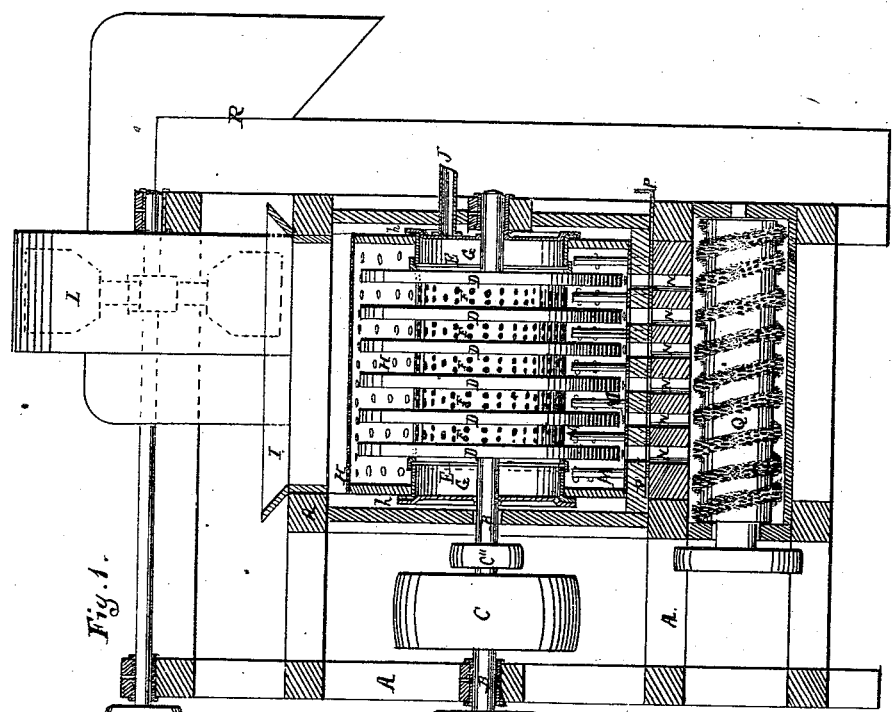

UNITED STATES PATENT OFFICE.

THOMAS WALLACE, OF CHICAGO, AND GEORGE W. HYDE, OF JOLIET, ILL.

IMPROVEMENT IN MACHINES FOR HULLING AND CLEANING GRAIN.

Specification forming part of Letters Patent No. 161,367, dated March 30, 1875; application filed February 10, 1873.

*To all whom it may concern:*

Be it known that we, THOMAS WALLACE, of Chicago, in the county of Cook and State of Illinois, and GEORGE W. HYDE, of Joliet, in the county of Will and State of Illinois, have invented certain Improvements in Machines for Hulling, Pearling, and Smutting Grain and Seeds, of which the following is a specification:

We employ a series of composition emery wheels or disks, carried side by side upon a common shaft. Said wheels or disks are made annular in form, and are placed upon the shaft so that between each pair of wheels there is a space, and this space is filled at the inner circle of the annular disks by perforated bands, forming, together with said disks, a cylinder, into which air may be forced, passing out through the perforated bands to carry off the dust, &c. These disks revolve in a body of grain contained in a cylindrical casing, fed from above along its entire length, and discharged from below along its entire length. By this construction, as will be explained, not only the periphery, but the entire surface of both sides of each disk of emery composite, is buried in the grain to be acted upon. By means of stationary rods projecting from the outside in between the disks, the grain is constantly stirred and caused to present new surfaces to the disks. The feed and discharge is operated entirely by gravity. The feed-opening above along the entire length of the disk-cylinder, and a regulated discharge-opening below along the entire length correspondingly, so that the grain may be drawn down directly from all parts at once equally, thus preventing the common danger of burning or scorching the grain by too long continued and excessive friction, and enabling the operator to govern the amount of decortication at pleasure. By regulating the time in which the grain is subjected to the action of the stones, various results are attained. It may be merely hulled, as in case of rice, or it may be pearled, as with barley, the entire cuticle being removed, which is also sometimes of advantage with wheat; or, again, the grain may be merely smutted, as in common smut-machines.

In the accompanying drawing, which forms a portion of this specification, Figure 1 is a side elevation of our machine, partially in section. Fig. 2 is an end view of the same, also partially in section.

Like letters of reference in both figures indicate like parts.

To enable those skilled in the art to make and use our invention, we will proceed to describe the same with particularity, making use in so doing of the aforesaid drawings by letters of reference thereto.

In the said drawings, A represents a suitable frame-work for the mechanism. B is the main shaft, furnished with the driving-pulley C, and with two other pulleys, one, C', to supply power to the fan-shaft, and one, C'', to supply power to the conveyer. D D, &c., are annular disks made of an emery composition, such as we have heretofore employed in our patented smutting-machine, or any well-known gritty natural stone or composition, which may be an equivalent therefor. These annular disks are placed at stated intervals along the main shaft, and are secured thereto by means of spiders E extending in upon the shaft. Between these disks at their inner circumference, and at the outer circumference of the spiders, are placed perforated bands F, secured to the flanges of the spiders, which project a little for this purpose. These bands, taken with the annular disks, form a central inclosed space surrounding the main shaft, which we denominate, for the sake of clearness, the inner cylinder or air-space G. Surrounding all and inclosing the disks is the outer perforated cylinder H, between which and the inner cylinder is the grain-space, into which is fed the grain to be operated upon. The grain is fed from above through the hopper I, entering along its entire length to all parts equally. The outer cylinder is stationary, and to preserve the continuity of the air-space the heads of said outer cylinder are provided with collars $h$, which set in through the heads and overlap a flange upon the outer disks, so that the disks and bands may revolve with the main shaft. An air-pipe, J, connected to a fan or other blast-producing contrivance, (not shown in the drawing,) forces a current of air into the inner cylinder or air-space, which finds its way out through the perforated bands F between the disks among the grain, forcing the dust out through the outer perforated cylinder into the inclosed space K, from whence it may be drawn by suitable pipes into the fan L, and discharged into a dust-bin or room, as in common machines. The annular disks are completely immersed in the body of grain lying in the grain-space, and consequently not only the periphery of the disks, but also their sides, act upon the mass, thus giving a large scouring-surface. To cause the grain to change position and present new surfaces to the scouring-faces of the disks, stationary rods M project from the bottom and two sides of the outer cylinder, in between the disks at every space, nearly to the bands F, centrally between the pairs of disks, these rods being of a size or diameter so that there shall be space between them and the adjacent disks for a single berry of grain to rotate or turn end for end. By the rotation of the disks the grain is constantly lifted or carried by friction in the direction of the rotation, and these rods, by opposing this, cause the stirring sought to be accomplished. Below the revolving disks, and along the entire length of the outer perforated cylinder, is cut a slot or discharge-aperture, opening into the ducts N, which may be opened or closed by a slide-valve arrangement, P. These ducts discharge the grain into a conveyer, Q, placed below. This conveyer consists of a wooden cylinder, upon which is mounted a spiral line of bristles, forming a screw-brush, the action of which is to gradually move the grain toward the discharge, but in a hesitating manner, so that the berries are brushed and cleansed before leaving the discharge. This brush-screw is surrounded by a perforated cylinder, through the perforations of which the dust, &c., escape. At the final discharge is placed the common suction-fan separating device R, which, by a forcible suction from the fan L, draws up the dust and light particles of grain, and separates them in the well-known manner. The grain is fed in above and descends among the disks of its own gravity, and may be there retained until it is smutted simply, or, if desired, until it is completely decorticated, and is drawn directly out from all parts at once, as above stated, so that, after it has arrived at the proper stage of decortication, there shall be no danger of burning it by causing it to pass still further among the scouring-surfaces. The discharge from this machine while in operation is continuous, the amount of decortication being governed by the rapidity of the discharge.

Having thus fully described the construction and operation of our invention, that which we deem new, and desire to secure by Letters Patent, is—

1. The vertical revolving annular disks D, spaced along a horizontal shaft, in combination with the cylinder H, into which the grain is fed along the entire length at the top, and from whence it is drawn along the entire length at the bottom, substantially as specified.

2. The combination of the vertical revolving disks D, cylinder H, and stationary rods M, projecting from said cylinder in between the disks at the sides and bottom, in the manner specified.

THOMAS WALLACE.
GEORGE WARREN HYDE.

Witnesses:
R. E. BARBER,
UZIAH MACK.